United States Patent Office 3,262,830
Patented July 26, 1966

3,262,830
ORGANOSILICON MOLDING COMPOSITIONS CONTAINING ORTHOTITANATE CATALYSTS
Harold L. Vincent, Midland, Mich., assignor to Dow Corning Corporation, Midland, Mich., a corporation of Michigan
No Drawing. Filed Apr. 19, 1961, Ser. No. 103,977
21 Claims. (Cl. 156—329)

This invention relates to the art of hydrolyzing alkoxy silanes and to the use of the hydrolyzates to make improved molded articles. The conventional method of hydrolyzing alkoxy silanes has been to mix the silane with water, usually with a solvent under conditions which form a two-phase system. Because the alkoxy silanes were difficult to hydrolyze, a mineral acid was usually added as a hydrolysis catalyst. The water and solvent-silane mixture were separated after the hydrolysis was completed. It was then necessary to neutralize the hydrolyzate solution. The hydrolysis product could be separated from the solvent by evaporation.

The fact that a strong acid catalyst has been heretofore used in the hydrolysis of alkoxy silanes, has invariably resulted in extensive condensation of the resulting hydrolyzate. Thus, under normal conditions for producing siloxane resins it has been essential that a large amount of solvents be employed to prevent gelation of the hydrolyzate. Furthermore, the resulting product has a relatively low silicon bonded hydroxyl content (i.e. 6 percent by weight or below).

The same factors prevail when one hydrolyzes a halosilane. Here of course large quantities of strong acid are produced. Thus, there is invariably extensive condensation of the hydrolyzate and the use of solvent is imperative.

Because of the above factors the present commercial silicone laminating and molding resins have been characterized by relatively low hydroxyl content, relatively high molecular weight as shown by a 50 percent solution viscosity of about 25 cs. and by the presence of appreciable amounts of cyclic siloxanes which contain no SiOH groups The latter are caused by the combined action of a strong acid catalyst and a solvent. These conditions promote the formation of cyclic structures.

The presence of these cyclics has resulted in some undesirable effects; the chief of which is extensive loss of physical strength of the cured resin at temperatures of 500° F. or above. Since silicone resins are designed for operation at elevated temperatures, this loss of strength has a considerable handicap to the use of silicone resins for structural purposes.

It is an object of this invention to provide a method of hydrolyzing alkoxy silanes rapidly in one step without the necessity of adding acid to the system. Satisfying this object would also eliminate the neutralization step and permit the hydrolysis to take place at a neutral pH. A further object of this invention is to provide a faster and more efficient method of hydrolyzing alkoxy silanes. Another object is to carry out the hydrolysis with a smaller quantity of water than has been used previously. Another object of this invention is to achieve better impregnation of various fillers. It is also the object of this invention to provide a method of making molded articles of improved high temperature strength.

This invention relates to a method of hydrolyzing a silane which comprises mixing until a homogeneous solution is obtained, (A) a silane of the formula $$R_nSi(OR')_{4-n}$$

in which R is selected from the group consisting of phenyl and monovalent aliphatic hydrocarbon radicals of less than 4 carbon atoms and R' is an alkyl group of less than 4 carbon atoms with $n$ having an average value of from .9 to 1.9, (B) water in an amount from .5 to 1 mole of $H_2O$ per mol of [OR'] groups in the silane, and (C) a catalyst selected from the group consisting of orthotitanates having the general formula $Ti(OR'')_4$ and partial condensates thereof, in which R" is composed of hydrogen and from 1 to 30 inclusive carbon atoms with any additional atoms in R" being selected from the group consisting of (a) nitrogen, which is present in the form of a carbon bonded amino group, there being no more than four such nitrogen atoms per R" group, and (b) oxygen, which is present in the form of groups selected from the group consisting of —COOH,

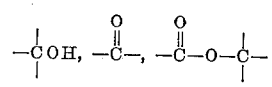

and

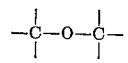

groups, wherein at least one unsatisfied valences of such group is satisfied by any remaining portion of the R" group and no more than one valence of such group is satisfied by a titanium-bonded oxygen, with any remaining unsatisfied valences being satisfied by hydrogen, there being no more than four total —COOH,

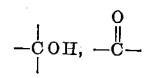

and

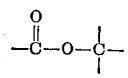

groups per R" group, said catalyst being present in an amount such that there is from .0001 to .012 mole of Ti per mole of Si.

The average value of $n$ is from .9 to 1.9 which means that the silane can be a pure silane of the type $RSi(OR')_3$ or mixtures of two or more silanes of this type or the silane can be a mixture of silanes of the formula $RSi(OR')_3$ with limited amounts of silanes of the type $Si(OR')_4$, $R_2Si(OR')_2$ and $R_3SiOR'$.

In the silanes employed herein, R can be, for example, phenyl, methyl, ethyl, propyl, vinyl, and allyl. Preferably R is phenyl or phenyl and methyl, R' can be methyl, ethyl and propyl. Preferably R' is methyl.

The amount of water used may be varied from .5 to 1 mole of $H_2O$ per mol of [OR'] groups in the silane. The lower value is critical for obtaining sufficient hydrolysis to prevent excessive loss of organosilicon material during the heating step hereinafter described. There is no advantage in employing more than 1 mol of water per mol of [OR'] groups.

The hydrolysis catalysts employed herein include orthotitanates of the formula $Ti(OR'')_4$ and partial condensates thereof. R" is composed of hydrogen and from 1 to 30 inclusive carbon atoms. Example 12, paragraph 1, contains examples of aliphatic (both saturated and unsaturated) and aromatic hydrocarbon titanates.

Any atoms other than carbon and hydrogen which can be present in R" are selected from the group consisting of nitrogen and oxygen atoms. Nitrogen is present in the form of carbon-bonded amino groups, there being no more than four such nitrogen atoms per R" group. Such R" group can contain tertiary (Example 12, paragraph 2), secondary (Example 12, paragraph 3), or primary amino groups (Example 12, paragraph 4).

Oxygen is present in the form of groups selected from the group consisting of —COOH,

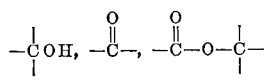

and

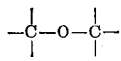

groups, wherein at least one of the unsatisfied valences of such groups is satisfied by any remaining portion of the R'' group and no more than one valence of such group is satisfied by a titanium-bonded oxygen, with any remaining unsatisfied valences being satisfied by hydrogen, there being no more than 4 total

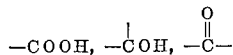

and

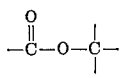

groups per R'' group. There can be four of any one of these groups or a total of four of the various combinations of these four groups. There can be any number of ether linkages in R''. For example, R'' in the last formula in Example 12, paragraph 7, contains 15 ether linkages. However, there is no particular advantage in having a large number of these linkages present.

The oxygen can be present as a —COOH group, such as shown in Example 12, paragraph 10. The carbon atom of the carboxyl group is bonded to the remaining part of R'' which in turn is bonded to the titanium-bonded oxygen atom.

The oxygen can be present in a

group as shown in Example 12, paragraph 6. The hydroxyl group can be present in the same R'' group as a nitrogen atom [Example 12, paragraph 2(a) and 3(b)] or a

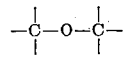

group (Example 12, paragraph 8) or in combination with any of the other oxygen containing groups. The hydroxyl group can also be present at any point along the carbon chain and may be attached to a primary, secondary or tertiary carbon atom, as shown in Example 12, paragraph 6, and more than one hydroxyl group can be present (subject to the above limitations on the total number of certain oxygen containing groups).

The oxygen can also be present as a

group. Thus R'' can be a carboxyacyl group (Example 12, paragraph 5); or a keto group (Example 12, paragraph 9), or an aldehyde group (Example 12, paragraph 12). When R'' is an acyl group the titanate is usually in polymeric form.

Oxygen can also be present in a

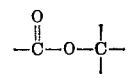

group as shown in Example 12, paragraph 11. This ester group can occupy either a terminal or any non-terminal position in R''. Either the alcohol or acid derived portion of the ester group can be bonded to the titanium-bonded oxygen as shown in Example 12, paragraph 11(a) and 11(b) respectively.

Finally, the oxygen can be present in a

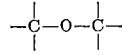

group as shown in Example 12, paragraph 7 and 8.

Titanates can be prepared containing various combinations of the nitrogen and oxygen containing groups, subject to the specified limitations on the total number of certain groups. For example, R'' groups containing both a hydroxyl group and nitrogen atom are shown in Example 12, paragraphs 2(a) and 3(b). R'' groups containing both OH groups and ether linkages are shown in Example 12, paragraph 8.

It should be apparent that not all of the R'' groups attached to the titanate need be the same. Example 12 contains numerous examples of titanates with mixed R'' groups.

Partial condensates of the above titanates can also be used. These partial condensates are characterized by having some of the (OR'') groups removed by hydrolysis and can obtain TiOTi linkages. These partial condensates are ethanol soluble. For example, the following partial condensates can be used:

$$(CH_3CH_2CH_2O)_3TiOTi(OCH_2CH_2CH_3)_3$$
$$[HO(CH_2)_8O]_2Ti(OH)_2$$

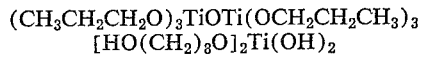

to

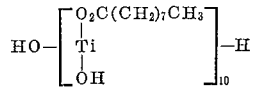

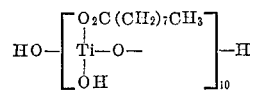

The orthotitanates employed in this invention are well known commercial materials. On the basis of commercial availability, tetrabutyl and tetraisopropyl titanates are preferred.

A curing catalyst may be mixed with the silane, water and orthotitanate mixture to promote the more rapid and effective curing of the hydrolysis product. Such catalysts are well known in the art. The catalysts disclosed in U.S. Patent No. 2,906,734 may be used in this invention. Other catalysts that can be used include metallic salts of carboxylic acids such as lead octoate, zinc hexoate, cobalt naphthenate and indium octoate; quaternary ammonium compounds such as trimethyl ammonium butoxide, benzyltrimethyl ammonium 2-ethylhexoate and beta-hydroxy ethyl trimethyl ammonium butoxide and amines such as triethanol amine. This list merely illustrates some of the curing catalysts that can be used. Such catalysts are not essential to the operativeness of this invention. The optimum amounts of catalyst to be used varies with the type of catalyst and the precise silane formulation. The curing catalyst can be added when the solution is prepared or at any time thereafter up to the time curing starts.

The silanes, titanates and water can be mixed in any suitable manner. The preferred manner is to mix the silane and water and then add the titanates. The hydrolysis may go to completion in a few seconds or may require several days, depending upon the silane and the amount of titanate added. In any event the hydrolysis occurs more rapidly with the titanate than without it. It may be necessary to agitate the mixture to speed up the hydrolysis. When the hydrolysis is completed, the mixture will be in one phase.

The hydrolyzates of this invention are low molecular weight organosilanols and organosiloxanols characterized in having high SiOH content. The hydrolyzate may also contain some residual unhydrolyzed alkoxy groups, particularly when the minimum amount of water is employed. The low molecular aggregation of the hydrolyzate is indicated by the low viscosity of the hydrolyzate solution. Because of the low viscosity of the hydrolyzate solutions, one obtains better impregnation of fillers than is obtained with heretofore employed commercial siloxane molding resins.

Furthermore, since the fillers are impregnated with only slightly condensed resins most of the polymerization takes place in situ on the filler thereby avoiding or minimizing the formation of cyclic siloxanes which cause a large decrease in strength at high temperatures. This is believed to be the reason why the method of this invention gives superior molded articles.

The homogeneous solution prepared by the method of this invention has a shelf life varying from several hours to several months depending on the silane and the amount of water and titanate used. The shelf life of the solution can be increased by decreasing the amount of water used and/or by using deionized water. Thus, it is possible to prepare the homogeneous solution several weeks prior to its use.

The homogeneous solution of organosilicon compound, water, by-produced alcohol and titanate can be used to impregnate a filler. The impregnated filler is then dried to remove any water and alcohol and is then ready for consolidation by heating. For the purpose of this invention the filler, after drying, must contain at least 1.5 percent by weight residual organosiloxane based on the weight of the filler. The most convenient way of carrying out this impregnation is by immersing the filler into the solution until the desired amount of pick-up is obtained. This may require more than one dipping. Impregnation can also be carried out by spraying, brushing or roller coating the solution onto the filler. The use of a titanate catalyst allows the dipping of the filler into the solution immediately after it is prepared. Thus, the neutralization step is eliminated.

Any filler that can be impregnated with conventional siloxane resins can be impregnated by the homogeneous solution of this invention. The filler can be in sheet, fibrous, or particulated form. Inorganic materials, such as metals, asbestos fibers and cloth, diatomaceous earth, talc, glass fibers and cloth, flake and integrated mica, metallic oxides such as aluminum oxide, $TiO_2$, MgO, ferric oxide, zinc oxide, crushed quartz, clays, finely divided silica, carbon black, powdered glass, silica aerogels similar inorganic materials can be used. Organic fillers such as paper (e.g. alpha-cellulose paper), nylon, dacron sawdust, etc. can be used.

After the filler has been impregnated the mixture is heated to at least partially cure the siloxane resin and consolidate the article. This initial curing can be carried out at from 90° to 120° C. in the absence of a curing catalyst or at lower temperatures when such catalysts are employed. For many applications the above cure is sufficient. This is particularly true when the filler is an organic material such as alpha-cellulose paper or when the primary use of the article is to be at relatively low temperatures. However, it is often desirable to cure the resin at higher temperatures (i.e., from 150° to 250° C.) when maximum strength at elevated temperatures is desired.

If desired, pressure can be applied during the heating step in order to aid in the consolidation of the article. The materials of this invention can be molded at relatively low pressures such as 10 p.s.i. although higher pressures can be employed if desired. Whether pressure is employed or not depends upon the type of article being made. When, for example, one wishes to bond glass mat for use as thermal insulation one can simply spray the hydrolyzate solution and thereafter heat to cure the resin. This bonds the fibers together at their points of intersection and produces a consolidated mat.

The compositions of this invention are particularly useful for making laminates in which the filler is a fibrous material such as asbestos, glass fibers or glass fabric.

These laminates can be made by conventional techniques. That is, the fibrous material is impregnated with the hydrolyzate and thereafter heated to remove volatiles and partially cure the resin. This process can be advantageously carried out continuously by passing the fibrous material through the hydrolyzate and then through a heating tower.

The resulting impregnated sheets can then be stacked to give the desired thickness and molded under heat and pressure to form a unitary article. If desired the laminate can be further cured at temperatures up to 250° C. or above to develop its maximum strength for high temperature use.

The molded articles of this invention have improved high temperature strength as shown in the examples. The molded articles of this invention are useful as structural members for electrical insulation and for thermal barriers.

Another method of impregnating or coating a substrate is by adding the homogenous solution to a beater slurry of the substrate and water. When the homogeneous solution comes into contact with the large volume of water in the beater slurry, the silicone resin precipitates onto the substrate. After the substrate is treated, the water is removed from the slurry and the impregnated substrate is dried. Impregnated substrates can then be molded between heated rolls. This method of treating substrates is especially useful for impregnating asbestos, mica, glass fiber and flakes and cellulosic materials such as paper. Papers made by this method have improved electrical and mechanical properties.

The following examples are illustrative only and should not be construed as limiting the invention which is properly delineated in the appended claims. All of the tests for flexural strength were made in accordance with ASTM D790–49T. Flexural strengths were determined immediately after the molded article has been exposed to the testing temperature for 30 minutes.

*Example 1*

2168 g. of a mixture of 33 mol percent phenyltrimethoxysilane, 66.1 mol percent of methyltrimethoxysilane and .9 mol percent diphenyldimethoxysilane were mixed with 540 g. of $H_2O$ (.75 mol of $H_2O$ per mol of [OR′] groups on the silane) and 2.27 g. of tetra-n-butyl titanate. The mixture became one phase very rapidly. The solution was cooled in a water bath. A portion of this solution remained in one phase for 40 days. A heat-cleaned 181 glass cloth, which is a continuous filament satin weave fabric, was hand-dipped in the above solution. This impregnated glass cloth was pre-cured for 3 minutes at 110° C. There was a resin pick-up of 34.3 percent by weight of solids based on the weight of the glass cloth. 14 plies of 8″ x 8″ sheets of the glass cloth were stacked so that the nodes on each sheet fitted into the indentations in the adjoining sheet. The sheets were then pressed together at 30 p.s.i. at 100° C. for 30 minutes. The laminate was then after-baked in an oven for 4 hours at 250° C. The laminate had a flexural strength of 28,900 p.s.i. at room temperature and 14,275 p.s.i. at 260° C.

*Example 2*

500 g. of phenyltrimethoxysilane were mixed with 100 g. of $H_2O$ (.75 mol of $H_2O$ per mol of [OR′] groups on the silane) and 1.62 g. of tetrabutyl titanate. The mixture was agitated until it became one phase solution and was allowed to stand overnight before being used. A heat-cleaned 181 glass cloth was hand dipped into the above solution. The impregnated glass cloth was pre-cured for 25 minutes at 110° C. There was a resin pick-up of 21 percent by weight of solids based on the weight of the glass cloth. 14 plies of 8″ x 8″ sheets of the glass cloth were stacked so that the nodes on each sheet fitted into the indentations in the adjoining sheet. The sheets were then pressed together at 30 p.s.i. at 175° C. for 30 minutes. The press temperature was raised to 250° C. in 15 minutes and held there for 30 minutes. The laminate was then after-backed in an oven for 4 hours at 250° C. The laminate was 103 mils thick. The laminate had a flexural strength of 25,238 p.s.i. at room temperature and 16,488 p.s.i. at 260° C.

Example 3

500 g. of phenyltrimethoxysilane were mixed with 100 g. $H_2O$ (.75 mol of $H_2O$ per mol of [OR'] groups on the silane) and 1.62 g. of tetrabutyl titanate. The mixture was agitated until it became one phase. A 0.065 g. of a soltuion of 20 percent by weight beta-hydroxyethyltrimethylammonium 2-ethylhexoate in n-butyl alcohol was aded to this solution. A heat-cleaned 181 glass cloth was hand dipped into the above solution. The impregnated glass cloth was pre-cured for 10 minutes at 110° C. There was a resin pick-up of 39 percent by weight of solids based on the weight of the glass cloth. 14 plies of 8″ x 8″ sheets of the glass cloth were stacked so that the nodes on each sheet fitted into the indentations in the adjoining sheet. The sheets were then pressed together at 30 p.s.i. at 175° C. for 30 minutes. The laminate was after-baked in an oven for 4 hours at 250° C. The laminate was 118 mils thick. The laminate had a flexural strength of 24,438 p.s.i. at room temperature and 20,538 p.s.i. at 260° C.

Example 4

500 g. of phenyltrimethoxysilane were mixed with 82 g. $H_2O$ (.6 mol of $H_2O$ per mol of [OR'] groups on the silane) and 1.62 g. of tetrabutyl titanate. The mixture was agitated until it became one phase and was allowed to stand overnight before being used. A heat-cleaned 181 glass cloth was hand dipped into the above solution. The impregnated glass cloth was pre-cured for 10 minutes at 110° C. There was a resin pick-up of 37.5 percent by weight of solids based on the weight of the glass cloth. 14 plies of 8″ x 8″ sheets of the glass cloth were stacked so that the nodes on each sheet fitted into the indentations on the adjoining sheet. The sheets were then pressed together at 30 p.s.i. at 100° C. for 30 minutes. The laminate was then after-baked in an oven for 4 hours at 250° C. The laminate was 109 mils thick. The laminate had a flexural strength of 27,325 p.s.i. at room temperature and 19,600 p.s.i. at 260° C.

Example 5

540 g. of phenytrimethoxysilane were mixed with 77.4 g. of $H_2O$ and 1.76 g. of tetra-n-butyl titanate. The solution was agitated until it became one phase. A heat-cleaned 181 glass cloth was hand dipped into the above solution. The impregnated glass cloth was then pre-cured for 30 minutes at 110° C. There was a resin pick-up of 34.3 percent. 14 plies of 8″ x 8″ sheets of the glass cloth were stacked so that the nodes on each sheet fitted into the indentations in the adjoining sheets. The sheets were then pressed together at 30 p.s.i. at 100° C. for 30 minutes. The press temperature was raised to 250° C. and maintained for 30 minutes. The laminate was after-baked in an oven for 4 hours at 250° C. The laminate had a flexural strength of 27,625 p.s.i. at room temperature and 16,138 p.s.i. at 260° C.

Example 6

276.4 g. of a mixture of 85 mol percent phenyltrimethoxysilane and 15 mol percent of dimethyldimethoxysilane were mixed with 49 g. $H_2O$ and 2.02 g. of tetra-n-butyl titanate. A heat-cleaned 181 glass cloth was hand dipped into the above solution. The impregnated glass cloth was pre-cured for 10 minutes at 110° C. There was a resin pick-up of 35 percent. 14 plies of 8″ x 8″ sheets of the glass cloth were stacked so that the nodes on each sheet fitted into the indentations in the adjoining sheet. The sheets were then pressed together at 30 p.s.i. at 250° C. for 30 minutes. The laminate was then after-baked in an oven for 4 hours at 250° C. The laminate had a flexural strength of 33,200 p.s.i. at room temperature and 18,388 p.s.i. at 260° C.

Example 7

550 g. of a mixture of 90.1 mol percent of phenyltrimethoxysilane and 9.9 mol percent of phenylmethyldimethoxysilane were mixed with 109 g. $H_2O$ and .363 g. of tetra-n-butyl titanate. The mixture became one phase in about one hour, .46 g. of a 6 percent by weight of potassium hydroxide was added to this solution. A heat-cleaned 181 glass cloth was hand dipped into the above solution. The glass cloth was then pre-cured for 10 minutes at 110° C. There was a resin pick-up of 38 percent. 14 plies of 8″ x 8″ sheets of the glass cloth were stacked so that the nodes in each sheet fitted into the indentations in the adjoining sheets. The sheets were then pressed together at 10 p.s.i. at 175° C. for 30 minutes and then the press temperature was raised to 250° C. and maintained there for 2½ hours. The laminate was then after-baked in an oven for 4 hours at 250° C. The laminate had a flexural strength of 24,300 p.s.i. at room temperature and 15,738 p.s.i. at 260° C.

Example 8

280 g. of a mixture of 74.2 mol percent of phenyltrimethoxysilane and 12.9 mol percent of dimethyldimethoxysilane and 12.9 mol percent of phenylmethyldimethoxysilane were mixed with 56 g. of $H_2O$ and .35 g. of tetra-n-butyl titanate. 0.06 g. of a 20 percent by weight solution of beta-hydroxyethyltrimethylammonium 2-hexoate in n-butyl alcohol was added to this solution. A heat cleaned 181 glass cloth was hand dipped into the above solution. The impregnated glass cloth was pre-cured for 10 minutes at 110° C. There was a resin pick-up of 36 percent. 14 plies of 8″ x 8″ sheets of the glass cloth were stacked so that the nodes on each sheet fitted into the indentations in the adjoining sheet. The sheets were then pressed together at 30 p.s.i. at 135° C. for 10 minutes and the press temperature was raised to 250° C. and maintained there for 30 minutes. The laminate was then after-baked in an oven for 4 hours at 250° C. The laminate had a flexural strength of 32,288 p.s.i. at room temperature and 15,563 p.s.i. at 260° C.

Example 9

300 g. of mixture of 90.1 mol percent of phenyltrimethoxysilane and 9.9 mol percent of phenylmethyldimethoxysilane were mixed with 59 g. of $H_2O$ and .198 g. of terta-n-butyl titanate. The mixture became one phase very rapidly. 249 g. of triethanolamine catalyst was added to the mixture. A heat-cleaned 181 glass cloth was hand dipped in the above solution. This impregnated glass cloth was pre-cured for 10 minutes at 110° C. There was a resin pick-up of 29 percent. 14 plies of 8″ x 8″ sheets of the glass cloth were stacked so that the nodes no each sheet fitted into the indentations in the adjoining sheet. The sheets were then pressed together at 10 p.s.i. at 175° C. for 30 minutes, and the temperature was then raised to 250° C. and maintained there for 17 hours. The laminate was then after-baked for 4 hours at 250° C. The laminate had a flexible strength of 26,543 p.s.i. at room temperature at 15,313 p.s.i. at 260° C.

Example 10

990 g. of phenyltrimethoxysilane was mixed with 202 g. of $H_2O$ and 3.93 g. of tetra-n-butyl titanate. The mixture was agitated until it became a one phase solution. A heat-cleaned 181 glass cloth was dipped in the above solution and was pre-cured in a 6 foot curing tower. The tower speed was ⅔ ft./min. The top of the tower had a temperature of 112° C. and the temperature at the bottom of the tower was 111° C. There was a resin pick-up of 32 percent by weight. Fourteen 12″ x 12″ plies of the glass cloth were pressed together at 30 p.s.i. at 130° C. for 30 minutes. The laminate was then after-baked in an oven for 4 hours at 250° C. The laminate had a flexural strength of 24,183 p.s.i. at room temperature, 20,317 p.s.i. at 260° C. and 17,257 p.s.i. at 423° C.

*Example 11*

680 g. of methyltrimethoxysilane were mixed with 144 g. of H$_2$O and .335 g. of tetra-n-butyl titanate. The mixture was agitated until it became one phase. Four inch wide strips of alpha-cellulose paper (.0053 p.s.i.) were hand dipped into the above formulation. Five to eight dippings were required to obtain a resin pick-up of from 65 to 70 percent, the paper was air dried between dippings. The paper was pre-cured for 8 minutes at 110° C. 12 plies of 4″ x 4″ paper strips were laminated together at 140° C. at 14,000 lbs./in.$^2$ for 30 minutes. The laminate could be easily cut and punched and the paper was throughly wet by the resin. The resulting product had a dielectric strength in excess of 400 volts per mil.

*Example 12*

Equivalent results are obtained when the method of Example 1 is repeated using one of the following catalysts in place of tetra-n-butyl titanate at the same mol ratio of Ti to Si:

[1]

Tetraphenyl, tetra-2-ethylhexyl, tetraoctyl, tetraundecyl, tetraoctadecyl, tetrapentacosyl, tetra-triacontyl, tetrallyl, tetra-1-hexenyl, tetra-4-octenyl, tetra-12-octadecenyl and tetra-20-triacontenyl titanates; a partial condensate of the formula (CH$_3$CH$_2$CH$_2$CH$_2$O)$_3$TiOTi(OCH$_2$CH$_2$CH$_2$CH$_3$)$_3$

[2(*a*)]

[(HOCH$_2$CH$_2$)$_2$NCH$_2$CH$_2$O]$_2$Ti[OCH(CH$_3$)$_2$]$_2$
[(HOCH$_2$CH$_2$)$_2$NCH$_2$CH$_2$O]$_4$Ti
[(HOC$_3$H$_6$)$_2$N(CH$_2$)$_3$O]$_2$Ti[OCH(CH$_3$)$_2$]$_2$
[(HOC$_3$H$_6$)$_2$N(CH$_2$)$_3$O]$_4$Ti
[(HOC$_6$H$_{12}$)$_2$N(CH$_2$)$_6$O]$_2$Ti[OCH$_2$CH(CH$_3$)$_2$]$_2$
[(HOC$_8$H$_{16}$)$_2$N(CH$_2$)$_8$O]$_2$Ti[OCH(CH$_3$)$_2$]$_2$

[2(*b*)]

[(CH$_3$CH$_2$)$_2$N(CH$_2$)$_2$O]$_2$Ti[OCH$_2$CH(CH$_3$)$_2$]$_2$
[(CH$_3$CH$_2$)$_2$N(CH$_2$)$_2$O]$_4$Ti
[(CH$_3$C$_2$H$_4$)$_2$N(CH$_2$)$_3$O]$_2$Ti[OCH(CH$_3$)$_2$]$_2$
[(CH$_3$C$_2$H$_4$)$_2$N(CH$_2$)$_3$O]$_4$Ti
[(CH$_3$C$_5$H$_{10}$)$_2$N(CH$_2$)$_6$O]$_2$Ti[OCH$_2$CH(CH$_3$)$_2$]$_2$
[(CH$_3$C$_7$H$_{14}$)$_2$N(CH$_2$)$_8$O]$_2$Ti[OCH(CH$_3$)$_2$]$_2$

[3(*a*)]

[(CH$_3$CH$_2$NHCH$_2$CH$_2$O]$_2$Ti[OCH(CH$_3$)$_2$]$_2$
[CH$_3$CH$_2$NHCH$_2$CH$_2$O]$_4$Ti
[CH$_3$(CH$_2$)$_3$NH(CH$_2$)$_4$O]$_2$Ti[OCH(CH$_3$)$_2$]$_2$
[CH$_3$(CH$_2$)$_3$NH(CH$_2$)$_4$O]$_4$Ti
[CH$_3$(CH$_2$)$_7$NH(CH$_2$)$_8$O]$_2$Ti[OCH(CH$_3$)$_2$]$_2$
[CH$_3$(CH$_2$)$_{12}$NH(CH$_2$)$_{13}$O]$_2$Ti[OCH(CH$_3$)$_2$]$_2$

[3(*b*)]

[HO(CH$_2$)$_2$NH(CH$_2$)$_2$O]$_2$Ti[OCH(CH$_3$)$_2$]$_2$
[HO(CH$_2$)$_2$NH(CH$_2$)$_2$O]$_4$Ti
[HO(CH$_2$)$_4$NH(CH$_2$)$_4$O]$_2$Ti[OCH(CH$_3$)$_2$]$_2$
[HO(CH$_2$)$_4$NH(CH$_2$)$_4$O]$_4$Ti
[HO(CH$_2$)$_8$NH(CH$_2$)$_8$O]$_2$Ti[OCH(CH$_3$)$_2$]$_2$
[HO(CH$_2$)$_{13}$NH(CH$_2$)$_{13}$O]$_2$Ti[OCH(CH$_3$)$_2$]$_2$
[(CH$_3$)$_2$N(CH$_2$)$_2$O]$_2$Ti[OCH(CH$_3$)$_2$]$_2$

[4]

[NH$_2$(CH$_2$)$_2$O]$_2$Ti[OCH(CH$_3$)$_2$]$_2$
[NH$_2$(CH$_2$)$_2$O]$_4$Ti
[NH$_2$(CH$_2$)$_4$O]$_2$Ti[OCH(CH$_3$)$_2$]$_2$
[NH$_2$(CH$_2$)$_4$O]$_4$Ti
[NH$_2$(CH$_2$)$_8$O]$_2$Ti[OCH(CH$_3$)$_2$]$_2$
[NH$_2$(CH$_2$)$_8$O]$_4$Ti
[NH$_2$(CH$_2$)$_{16}$O]$_2$Ti[OCH(CH$_3$)$_2$]$_2$
[NH$_2$(CH$_2$)$_{26}$O]$_2$Ti[OCH(CH$_3$)$_2$]$_2$

[5]

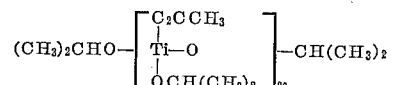
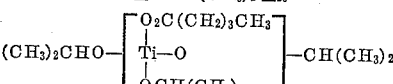
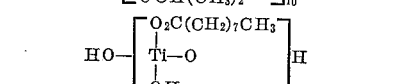
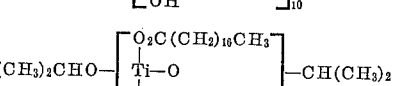
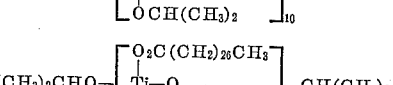
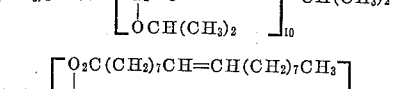

[HCO$_2$]$_2$Ti[OCH(CH$_3$)$_2$]$_2$

[6]

[HOCH$_2$CH$_2$O]$_2$Ti[OCH$_2$CH(CH$_3$)$_2$]$_2$
[HOCH$_2$CH$_2$O]$_4$Ti
[HO(CH$_2$)$_4$O]$_2$Ti[OCH$_2$CH(CH$_3$)$_2$]$_2$
[HO(CH$_2$)$_8$O]$_2$Ti[OCH$_2$CH(CH$_3$)$_2$]$_2$
[HO(CH$_2$)$_8$O]$_4$Ti
[HO(CH$_2$)$_8$O]$_2$Ti[OH]$_2$
[HO(CH$_2$)$_{18}$O]$_2$Ti[OCH(CH$_3$)$_2$]$_2$
[HO(CH$_2$)$_{18}$O]$_4$Ti
[HO(CH$_2$)$_{26}$O]$_2$Ti[OCH(CH$_3$)$_2$]$_2$
[CH$_3$(CH$_2$)$_3$CH(OH)CH$_2$O]$_2$Ti[OCH(CH$_3$)$_2$]$_2$
[HOC(CH$_3$)$_2$CH$_2$O]$_2$Ti[OCH(CH$_3$)$_2$]$_2$
[CH$_3$CHOHCHOHCH$_2$O]$_2$Ti[OCH(CH$_3$)$_2$]$_2$

[7]

[CH$_3$OCH$_2$CH$_2$O]$_2$Ti[OCH(CH$_3$)$_2$]$_2$
[CH$_3$OCH$_2$CH$_2$O]$_4$Ti
[CH$_3$(CH$_2$)$_2$O(CH$_2$)$_4$O]$_2$Ti[OCH(CH$_3$)$_2$]$_2$
[CH$_3$(CH$_2$)$_2$O(CH$_2$)$_4$O]$_4$Ti
[CH$_3$(CH$_2$)$_5$O(CH$_2$)$_6$O]$_2$Ti[OCH(CH$_3$)$_2$]$_2$
[CH$_3$(CH$_2$)$_5$O(CH$_2$)$_6$O]$_4$Ti
[CH$_3$(CH$_2$)$_9$O(CH$_2$)$_8$O]$_2$Ti[OCH(CH$_3$)$_2$]$_2$
[CH$_3$(CH$_2$)$_{14}$O(CH$_2$)$_{13}$O]$_2$Ti[OCH(CH$_3$)$_2$]$_2$
[CH$_3$CH$_2$(OCH$_2$CH$_2$)$_{15}$O]$_2$Ti[OCH(CH$_3$)$_2$]$_2$

[8]

[HO(CH$_2$CH$_2$O)$_2$]$_2$Ti[OCH(CH$_3$)$_2$]$_2$
[HO(CH$_2$CH$_2$O)$_2$]$_4$Ti
[HOCH$_2$CH$_2$O(CH$_2$)$_4$O]$_2$Ti[OCH(CH$_3$)$_2$]$_2$
[HO(CH$_2$)$_5$O(CH$_2$)$_5$O]$_2$Ti[OCH(CH$_3$)$_2$]$_2$
[HO(CH$_2$)$_{10}$O(CH$_2$)$_8$O]$_2$Ti[OCH(CH$_3$)$_2$]$_2$
[HO(CH$_2$)$_{10}$O(CH$_2$)$_8$O]$_4$Ti
[HO(CH$_2$)$_{12}$O(CH$_2$)$_{14}$O]$_2$Ti[OCH(CH$_3$)$_2$]$_2$
[HOCH$_2$CH$_2$(OCH$_2$CH$_2$)$_5$O]$_2$Ti[OCH(CH$_3$)$_2$]$_2$

[9]

[CH$_3$COCH=C(CH$_3$)O]$_2$Ti[OC$_3$H$_7$]$_2$
[CH$_3$COCH=C(CH$_3$)O]$_4$Ti
[CH$_3$CO(CH$_2$)$_{10}$CH=C(CH$_3$)O]$_2$Ti[OC$_3$H$_7$]$_2$
[CH$_3$CO(CH$_2$)$_{10}$CH=C(CH$_3$)O]$_4$Ti
[CH$_3$CO(CH$_2$)$_{13}$CH=C(CH$_3$)O]$_2$Ti[OC$_3$H$_7$]$_2$
[CH$_3$CO(CH$_2$)$_{19}$CH=C(CH$_3$)O]$_2$Ti[OC$_3$H$_7$]$_2$

[10]

[HOOCCH(CH$_3$)O]$_2$Ti(OH)$_2$
[HOOCCH(CH$_3$)O]$_4$Ti
[HOOC(CH$_2$)$_4$CH(CH$_3$)O]$_2$Ti(OH)$_2$

[HOOC(CH$_2$)$_4$CH(CH$_3$)O]$_4$Ti
[HOOCCH(C$_4$H$_9$)O]$_2$Ti[OCH(CH$_3$)$_2$]$_2$
[HOOCCH$_2$CH(C$_5$H$_{11}$)O]$_2$Ti[OCH(CH$_3$)$_2$]$_2$

[11(a)]

(CH$_3$COOCH$_2$O)$_2$Ti[OCH(CH$_3$)$_2$]$_2$
(CH$_3$COOCH$_2$O)$_4$Ti
[CH$_3$(CH$_2$)$_3$COO(CH$_2$)$_2$O]$_2$Ti[OCH(CH$_3$)$_2$]$_2$
[CH$_3$(CH$_2$)$_3$COO(CH$_2$)$_2$O]$_4$Ti
[CH$_3$(CH$_2$)$_5$COO(CH$_2$)$_5$O]$_2$Ti[OCH(CH$_3$)$_2$]$_2$
[CH$_3$(CH$_2$)$_5$COO(CH$_2$)$_5$O]$_4$Ti
[CH$_3$(CH$_2$)$_9$COO(CH$_2$)$_7$O]$_2$Ti[OCH(CH$_3$)$_2$]$_2$
[CH$_3$(CH$_2$)$_{13}$COO(CH$_2$)$_{12}$O]Ti[OCH(CH$_3$)$_2$]$_2$

[11(b)]

(CH$_3$OOCCH$_2$O)$_2$Ti[OCH(CH$_3$)$_2$]$_2$
(CH$_3$OOCCH$_2$O)$_4$Ti
[CH$_3$(CH$_2$)$_3$OOC(CH$_2$)$_2$O]$_2$Ti[OCH(CH$_3$)$_2$]$_2$
[CH$_3$(CH$_2$)$_5$OOC(CH$_2$)$_5$O]$_2$Ti[OCH(CH$_3$)$_2$]$_2$
[CH$_3$(CH$_2$)$_5$OOC(CH$_2$)$_5$O]$_4$Ti
[CH$_3$(CH$_2$)$_8$OOC(CH$_2$)$_8$O]$_2$Ti[OCH(CH$_3$)$_2$]$_2$
[CH$_3$(CH$_2$)$_{13}$OOC(CH$_2$)$_{12}$O]$_2$Ti[OCH(CH$_3$)$_2$]$_2$

[12]

(OCHCH$_2$O)$_2$Ti[OCH(CH$_3$)$_2$]$_2$
(OCHCH$_2$O)$_4$Ti
[OCH(CH$_2$)$_7$O]$_2$Ti[OCH(CH$_3$)$_2$]$_2$
[OCH(CH$_2$)$_7$O]$_2$Ti
[OCH(CH$_2$)$_{17}$O]$_2$Ti[OCH(CH$_3$)$_2$]$_2$
[OCH(CH$_2$)$_{25}$O]$_2$Ti[OCH(CH$_3$)$_2$]$_2$

*Example 13*

Equivalent results are obtained when the method of Example 1 is repeated using one of the following silanes in place of the methyltrimethoxysilane at the same mol percentage; vinyltrimethoxysilane, propyltrimethoxysilane, methyltriethoxysilane, allyltrimethoxysilane and phenyltripropoxysilane.

*Example 14*

Equivalent results are obtained when the method of Example 11 is repeated using 87 mol percent dimethyldimethoxysilane and 13 mol percent phenyltrimethoxysilane in place of methyltrimethoxysilane in the same ratio of H$_2$O to [OR'] groups on the silane and with the same mol ratio of Ti to Si.

*Example 15*

Equivalent results are obtained when the method of Example 7 is repeated using one of the following curing catalysts in place of potassium hydroxide: trimethyl ammonium butoxide, lead octoate and cobalt naphthenate.

That which is claimed is:

1. A method of hydrolyzing a silane which comprises mixing, until a homogeneous solution is obtained,
   (A) a silane of the formula R$_n$Si(OR')$_{4-n}$ in which R is selected from the group consisting of phenyl and monovalent aliphatic hydrocarbon radicals of less than 4 carbon atoms, and R' is an alkyl group of less than 4 carbon atoms with $n$ having an average value of from .9 to 1.9,
   (B) water in an amount from .5 to 1 mol of H$_2$O per mol of [OR'] groups in the silane, and
   (C) a catalyst selected from the group consisting of orthotitanates having the general formula Ti(OR")$_4$ and partial condensates thereof, in which R" is selected from the group consisting of hydrogen, hydrocarbon groups containing 1 to 30 carbon atoms and appropriately substituted hydrocarbons in which any atoms other than carbon and hydrogen are selected from the group consisting of nitrogen and oxygen atoms, said catalyst being present in an amount such that there is from .0001 to .012 mol of Ti per mol of Si.

2. The method of claim 1 in which R' is CH$_3$ and some of the R groups are methyl and some are phenyl radicals and R" is an alkyl group of from 1 to 18 inclusive carbon atoms.

3. A homogeneous solution produced by mixing
   (A) a silane of the formula R$_n$Si(OR')$_{4-n}$ in which R is selected from the group consisting of phenyl and monovalent aliphatic hydrocarbon radicals with less than four carbon atoms and R' is an alkyl group of less than 4 carbon atoms with $n$ having an average value of from .9 to 1.9,
   (B) from .5 to 1 mol of H$_2$O per mol of [OR'] groups on the silane, and
   (C) a hydrolysis catalyst selected from the group consisting of orthotitanates having the general formula Ti(OR")$_4$ and partial condensates thereof in which R" is selected from the group consisting of hydrogen, hydrocarbon groups containing 1 to 30 carbon atoms and appropriately substituted hydrocarbons in which any atoms other than carbon and hydrogen are selected from the group consisting of nitrogen and oxygen atoms, said catalyst being present in an amount such that there is from .001 to .012 mol of Ti per mol of Si.

4. The homogeneous solution of claim 3 in which R' is CH$_3$ and some of the R groups are methyl and some are phenyl radicals and R" is an alkyl group of from 1 to 18 inclusive carbon atoms.

5. A method of preparing a silicone resin impregnated filler which comprises impregnating a filler with a homogeneous solution produced by mixing
   (A) a silane of the formula R$_n$Si(OR')$_{4-n}$ in which R is selected from the group consisting of phenyl and monovalent aliphatic hydrocarbon radicals of less than 4 carbon atoms and R' is an alkyl group of less than 4 carbon atoms with $n$ having an average value of from .9 to 1.9,
   (B) from .5 to 1 mol of H$_2$O per mol of [OR'] groups on the silane, and
   (C) a hydrolysis catalyst selected from the group consisting of orthotitanates having the general formula Ti(OR")$_4$ and partial condensates thereof, in which R" is selected from the group consisting of hydrogen, hydrocarbon groups containing 1 to 30 carbon atoms and appropriately substituted hydrocarbons in which any atoms other than carbon and hydrogen are selected from the group consisting of nitrogen and oxygen atoms, said catalyst being present in an amount such that there is from .0001 to .012 mol of Ti per mol of Si, then drying the impregnated filler to remove any water and alcohol whereby an organosiloxane is produced, (A) being employed in such amount that there is a pick-up by the filler of at least 1.5 weight percent residual organosiloxane based on the weight of the filler.

6. The method of claim 5 which contains the additional step of heating the dried impregnated filler to consolidate it.

7. The method of claim 5 in which a curing catalyst for the organosiloxane is used.

8. The method of claim 5 in which a curing catalyst for the organosiloxane is used and which contains the additional step of heating the dried impregnated filler under pressure to consolidate it.

9. The method of claim 5 in which the silane is phenyltrimethoxysilane.

10. The method of claim 5 in which R' is CH$_3$ and: some of the R groups are methyl and some are phenyl radicals and R" is an alkyl group of from 1 to 18 inclusive carbon atoms.

11. The method of claim 10 which contains the additional step of heating the dried impregnated filler to consolidate it.

12. The method of claim 10 in which a curing catalyst for the organosiloxane is used.

13. The method of claim 10 in which a curing catalyst for the organosiloxane is used and which contains the additional step of heating the dried impregnated filler under pressure to consolidate it.

14. A method for the manufacture of an organosiloxane molded article which comprises
  (1) impregnating a filler with a homogeneous solution produced by mixing
    (A) a silane of the formula $R_nSi(OR')_{4-n}$ in which R is selected from the group consisting of phenyl and monovalent aliphatic hydrocarbon radicals with less than 4 carbon atoms and R' is an alkyl group of less than 4 carbon atoms with $n$ having an average value of from .9 to 1.9,
    (B) from .5 to 1 mol of $H_2O$ per mol of [OR'] groups on the silane, and
    (C) a hydrolysis catalyst selected from the group consisting of orthotitanates having the general formula $Ti(OR'')_4$ and partial condensates thereof, in which R'' is selected from the group consisting of hydrogen, hydrocarbon groups containing 1 to 30 carbon atoms and appropriately substituted hydrocarbons in which any atoms other than carbon and hydrogen are selected from the group consisting of nitrogen and oxygen atoms, said catalyst being present in an amount such that there is from .0001 to .012 mol of Ti per mol of Si, so that there is a resin pick-up of at least 1.5 percent by weight residual organosiloxane based on the weight of the filler,
  (2) pre-curing the impregnated filler to an extent such that the filler is sufficiently thermoplastic to be molded into a unitary mass,
  (3) subjecting the pre-cured filler to sufficient heat and pressure to bond and consolidate the filler, and
  (4) after-curing the resulting molded articles at gradually increasing temperatures.

15. The method of claim 14 in which a curing catalyst for the organosiloxane is used.

16. The method of claim 14 in which R' is $CH_3$ and some of the R groups are methyl and some are phenyl radicals and R'' is an alkyl group of from 1 to 18 inclusive carbon atoms.

17. The method of claim 16 in which a curing catalyst for the organosiloxane is used.

18. A method for the manufacture of an organosiloxane laminate which comprises
  (1) impregnating a fibrous sheet material with a homogeneous solution produced by mixing
    (A) a silane of the formula $R_nSi(OR')_{4-n}$ in which R is selected from the group consisting of phenyl and monovalent aliphatic hydrocarbon radicals with less than 4 carbon atoms and R' is an alkyl group of less than 4 carbon atoms with $n$ having an average value of from .9 to 1.9,
    (B) from .5 to 1 mol of $H_2O$ per mol of [OR'] groups on the silane, and
    (C) a hydrolysis catalyst selected from the group consisting of orthotitanates having the general formula $Ti(OR'')_4$ and partial condensates thereof, in which R'' is selected from the group consisting of hydrogen, hydrocarbon groups containing 1 to 30 carbon atoms and appropriately substituted hydrocarbons in which any atoms other than carbon and hydrogen are selected from the group consisting of nitrogen and oxygen atoms, said catalyst being present in an amount from .001 to .012 mol of Ti per mol of Si, so that there is a resin pick-up by the material of at least 1.5 percent by weight of organosiloxane solids based on the weight of the material,
  (2) pre-curing the impregnated sheet of material to an extent such that it is sufficiently thermoplastic to be laminated with other sheets of impregnated material,
  (3) assembling multiple plies of the sheets of material so impregnated and pre-cured to form a laminate,
  (4) subjecting the assembly to sufficient heat and pressure to bond and consolidate the plies, and
  (5) after-curing the resulting laminate at gradually increasing temperatures.

19. The method of claim 18 in which a curing catalyst for the organosiloxane is used.

20. A method for the manufacture of an organosiloxane laminate which comprises the steps of
  (1) dipping a fibrous sheet material into a homogeneous solution produced by mixing
    (A) a silane of the formula $R_nSi(OCH_3)_{4-n}$ in which some of the R groups are methyl and some are phenyl radicals with $n$ having an average value of from .9 to 1.9,
    (B) from .5 to 1 mol of $H_2O$ per mol of [$OCH_3$] groups on the silane, and
    (C) a hydrolysis catalyst selected from the group consisting of orthotitanates having the general formula $Ti(OR'')_4$ and partial condensates thereof in which R'' is an alkyl group of from 1 to 18 inclusive carbon atoms, said catalyst being present in an amount from .0001 to .012 mol of Ti per mol of Si, said silane being employed in amount such that there is at least 1.5 percent by weight residual organosiloxane on said fibrous material,
  (2) pre-curing the impregnated sheet of material to an extent such that it is sufficiently thermoplastic to be laminated with other sheets of impregnated material,
  (3) assemblying multiple plies of the sheets of material so impregnated and pre-cured to form a laminate,
  (4) subjecting the assembly to sufficient heat and pressure to consolidate and bond the plies, and
  (5) after-curing the resulting laminate at gradually increasing temperatures.

21. The method of claim 20 in which a curing catalyst for the organosiloxane is used.

References Cited by the Examiner

UNITED STATES PATENTS

| | | | |
|---|---|---|---|
| 2,486,162 | 10/1949 | Hyde | 260—46.2 |
| 2,718,483 | 9/1955 | Clark | 260—37 |
| 2,970,126 | 1/1961 | Brown | 260—46 |
| 2,993,809 | 7/1961 | Bueche et al. | 260—37 |

EARL M. BERGERT, *Primary Examiner.*

WILLIAM H. SHORT, *Examiner.*

L. G. KASTRINER, J. P. MELOCHE,
*Assistant Examiners.*

UNITED STATES PATENT OFFICE
CERTIFICATE OF CORRECTION

Patent No. 3,262,830                                                    July 26, 1966

Harold L. Vincent

It is hereby certified that error appears in the above numbered patent requiring correction and that the said Letters Patent should read as corrected below.

Column 2, line 24, after "one" insert -- of the --; column 3, lines 17 to 19, for the middle portion of the formula reading:

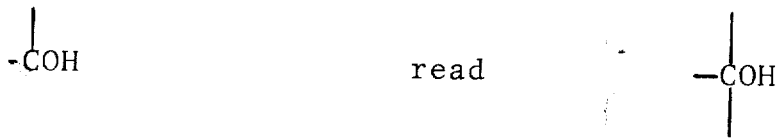

column 4, lines 24 to 35, strike out the formulas as shown in the patent and instead insert the following:

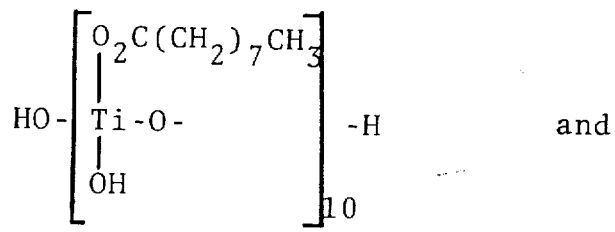

column 8, line 49, for "terta-n-butyl" read -- tetra-n-butyl --; line 56, for "no" read -- on --; line 61, for "flexible" read -- flexural --; column 10, lines 3 to 5, the formula should appear as shown below instead of as in the patent:

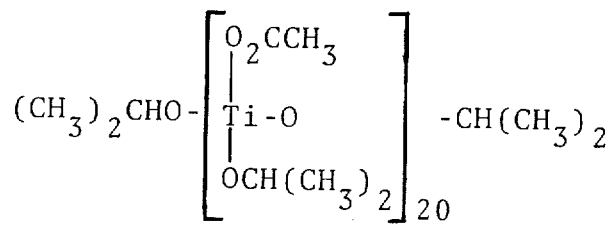

3,262,830 column 11, line 28, for "$[OCH(CH_2)_7O]_2Ti$" read -- $[OCH(CH_2)_7O]_4Ti$ --; column 12, line 21, and column 14, line 3, for ".001", each occurrence, read -- .0001 --.

Signed and sealed this 26th day of September, 1967.

(SEAL)
Attest:

ERNEST W. SWIDER
Attesting Officer

EDWARD J. BRENNER
Commissioner of Patents